United States Patent [19]
Nakazawa

[11] Patent Number: 5,828,023
[45] Date of Patent: Oct. 27, 1998

[54] INHIBITOR SWITCH FOR DETECTING POSITION OF AUTOMOBILE AUTOMATIC GEAR SHIFTER INCLUDING OPERATING LEVER STOPPERS

[75] Inventor: Takashi Nakazawa, Tokyo, Japan

[73] Assignee: Niles Parts Co., Ltd., Japan

[21] Appl. No.: 826,125

[22] Filed: Mar. 27, 1997

[30] Foreign Application Priority Data

Mar. 28, 1996  [JP]  Japan ................................. 8-099016
Mar. 28, 1996  [JP]  Japan ................................. 8-099017

[51] Int. Cl.⁶ ............................ H01H 3/16; H01H 21/02; H01H 21/22
[52] U.S. Cl. .................................. 200/61.88; 200/61.91; 200/336
[58] Field of Search .................. 200/11 R, 11 D, 200/11 DA, 11 G, 11 J, 11 K, 11 TW, 61.88–61.91, 335, 336, 571

[56] References Cited

U.S. PATENT DOCUMENTS

| | | | |
|---|---|---|---|
| 3,939,313 | 2/1976 | Hayashi et al. ................. | 200/11 J |
| 4,897,513 | 1/1990 | Oka et al. ........................ | 200/11 EA |
| 5,023,414 | 6/1991 | Mihara et al. ................... | 200/61.91 |
| 5,679,937 | 10/1997 | Iwata ............................... | 200/61.88 |
| 5,693,925 | 12/1997 | Yamada et al. ................. | 200/61.88 |

FOREIGN PATENT DOCUMENTS

| | | |
|---|---|---|
| HE12145736 | 12/1990 | Japan . |
| 815150 | 6/1959 | United Kingdom . |
| 2 300 759 | 11/1996 | United Kingdom . |

*Primary Examiner*—J. R. Scott
*Attorney, Agent, or Firm*—Rader, Fishman & Grauer

[57] ABSTRACT

An inhibitor switch device having a projected portion on a bottom side of an operating lever, stoppers on an external wall of a case of the device that impact with the projected portion and allow a movement range of the operating lever that goes outside of the case, with heights set lower than the height of the bottom side of the operating lever, and a rotating axle with a rotating torque bearing that has a first projecting portion with a narrower width than a second projecting portion, ultrasonically bonded to an operating lever that has a first gutter with a narrower width than a second gutter and a bonding hole that the rotating torque bearing fits into.

12 Claims, 5 Drawing Sheets

INHIBITOR SWITCH FOR DETECTING POSITION OF AUTOMOBILE AUTOMATIC GEAR SHIFTER INCLUDING OPERATING LEVER STOPPERS

BACKGROUND OF THE INVENTION

1. Field of the Invention

The present invention relates generally to an inhibitor switch that detects the position of an automatic gear shifter of an automobile and, in particular, to an inhibitor switch device having an improved rotating torque bearing and an improved stopper arrangement for limiting a range of movement of an operating lever.

2. Description of the Related Art

An inhibitor switch device related to the present invention has been used as a switch to detect the position of an automatic gear shifter of an automobile. Such an inhibitor switch device is disclosed, for example, in Japanese Laid Open Patent Publication No. Hei 2(1990)-145736.

Figure 10:
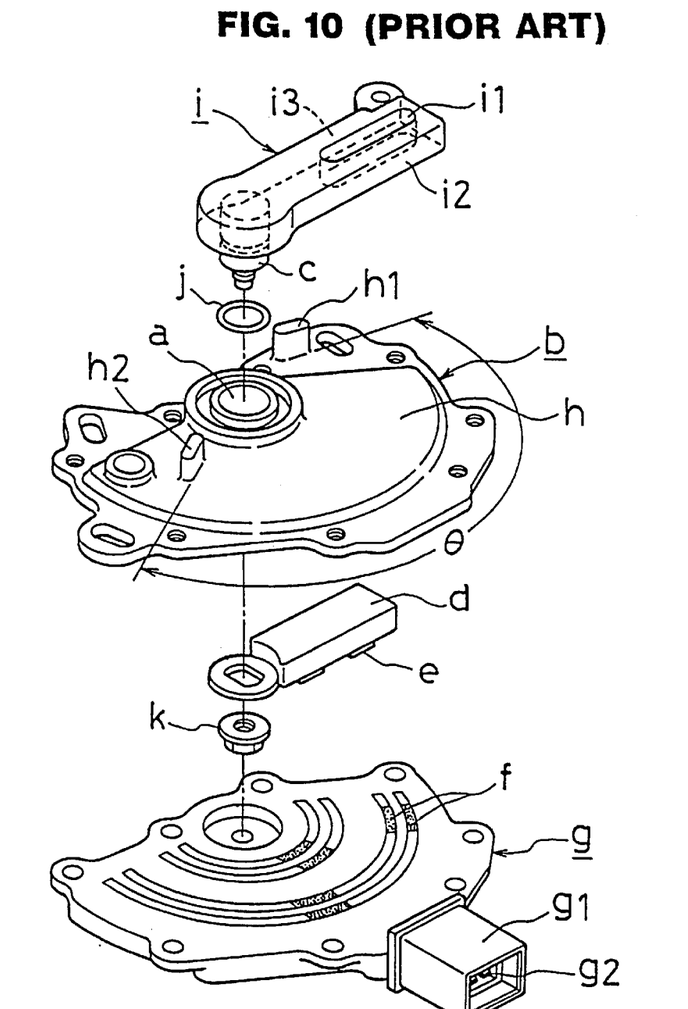
FIG. 10 is an exploded perspective view of a conventional inhibitor switch device.
Figure 11:
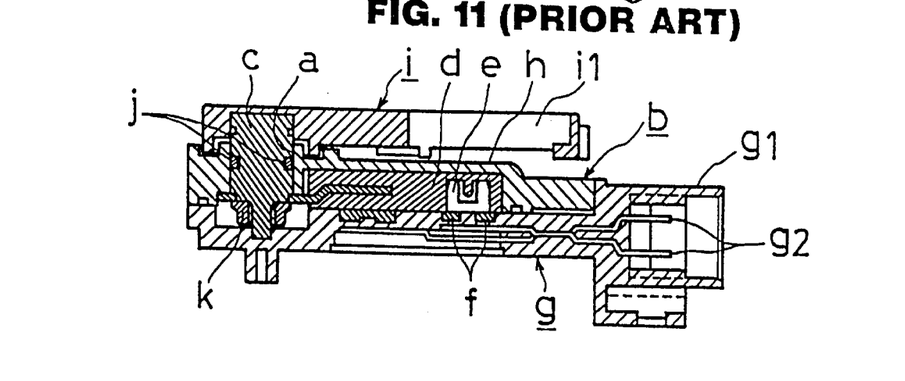
FIG. 11 is a cross-sectional side view of the conventional inhibitor switch device shown in FIG. 10.

FIGS. 10 and 11 illustrate an example of a conventional inhibitor switch device. The conventional inhibitor switch device includes a case b that has a bearing hole a, a rotating axle c that fits into the bearing hole a so that the rotating axle c moves freely, a movable plate d that is integrated with the rotating axle c and moves freely in the case b, a movable contact point e on the movable plate d, a fixed contact point f that corresponds with the movable contact point e, a platform g that supports the fixed contact point f and houses the movable plate d by connecting with the case b, and an operating lever i that is fixed to the rotating axle c and, at the same time, moves freely on an external surface h of the case b. Two stoppers h1 and h2 are provided on the external surface h of the case b. Each edge i2 and i3 of the operating lever i impacts one of the stoppers h1 and h2, so that the range of movement θ of the operating lever i is limited.

The rotating axle c is comprised of metal materials and is formed by insertion molding into the operating lever i. An O-ring j is installed on the rotating axle c and seals the gap between the rotating axle c and the case b. Furthermore, the rotating axle c is fixed to the movable plate d using a nut k. A connector g1 is integrated into the platform g, and a terminal g2 is electrically connected with the fixed contact point f inside the connector g1.

In an inhibitor switch device that has the above-described structure, a connecting hole i1 of the operating lever i is connected to the manual valve of an automatic gear shifter (not shown) or a shift lever by the driver's seat (not shown) of a vehicle, for example, so that when the operating lever i moves along with the movement of the shift lever, the movable plate d within the case b moves along with the operating lever i, and the movable contact point e moves in and out of connecting positions with the fixed point f. The fixed point f is connected to a controller (not shown) via a terminal g2, so that the controller can control each action by on/off signals that correspond to the shifter position.

The conventional inhibitor switch device described above has a structure wherein both edges i2, i3 of the operating lever i impact each stopper h1 and h2 so that the range of movement of the operating lever i is limited. Therefore, since the stoppers h1 and h2 are formed on the case b, the range of movement θ of the operating lever i cannot extend outside of the case b. If the range of movement θ of the operating lever i is to be enlarged or extended in either direction past the edge of the case b, it is necessary to increase the size of the case b or add a projected portion to the case to position the stoppers h1 and h2 at appropriate locations.

Moreover, in the case that the rotating axle c of the conventional inhibitor switch device is bonded to the operating lever i by ultrasonic bonding, when the material of the rotating axle c is changed from a metal to a resin material, there is a risk that the bonded portion is destroyed due to the rotating torque that the operating lever i receives, unless the strength of the ultrasonic bonding is enhanced. In addition, when the shape of the rotating torque bearing is chosen to be a simple toothed wheel in order to enhance the strength of the ultrasonic bonding portion, the relative position between the movable plate d and the operating lever i during assembly is such that it is possible to be assembled incorrectly. If the relative position between the movable plate d and the operating lever i during assembly is improper, a problem exists because the position of the shifter will not be properly detected by the inhibitor switch device.

SUMMARY OF THE INVENTION

An object of the present invention is to solve the problems with the conventional inhibitor switch devices described above.

More specifically, it is an object of the present invention to provide an inhibitor switch device having stoppers on the external wall of the case that provide a limited range of movement of the operating lever that extends outside of the case.

It is a further object of the present invention to provide a switch inhibitor device having multiple sets of stoppers on the external wall of the case which are adapted to provide different ranges of movement for different operating levers.

It is a further object of the present invention to provide a switch inhibitor device having a rotating axle made of resin, the rotating axle being bonded to the operating lever with ultrasonic bonding, wherein the strength of the ultrasonic bonding portion is enhanced so that it prevents breaking of the bonded part.

It is yet a further object of the present invention to provide a switch inhibitor device in which the relative position between the movable plate and the operating lever during assembly is standardized so that it prevents improper assembly.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with a first aspect of the present invention, in order to solve the problems described above, an inhibitor switch device is provided, comprising: a case with a bearing hole; a rotating axle that fits into the bearing hole so that the rotating axle rotates freely; a movable plate that moves freely in the case, the movable plate being integrated with the rotating axle; a movable contact point supported on the movable plate; a fixed contact point that corresponds with the movable contact point; a platform that supports the fixed contact point and houses the movable plate in conjunction with the case; and an operating lever that is fixed to the rotating axle and moves on an external surface of the case; wherein projected portions are formed on the bottom side of the operating lever, and stoppers which impact with the projected portions are formed on an external wall of the case.

A height of the stoppers of the inhibitor switch device from the external wall is preferably set lower than a height of a bottom side of the operating lever from the external wall. Moreover, in one embodiment, the stoppers are located at different distances from a center of rotation of the rotating axle. In this embodiment, a first and second set of stoppers are provided, and the first set of stoppers permit a range of movement of the operating lever which is different than a range of movement permitted by the second set of stoppers.

In accordance with a second aspect of the present invention, in order to solve the problems described above, an inhibitor switch device is provided, comprising: a case with a bearing hole; a rotating axle that fits into the bearing hole so that the rotating axle rotates freely; a movable plate that moves freely in the case, the movable plate being integrated with the rotating axle; a movable contact point supported on the movable plate; a fixed contact point that corresponds with the movable contact point; a platform that supports the fixed contact point and houses the movable plate in conjunction with the case; an operating lever that is fixed to the rotating axle and moves on an external surface of the case; and a rotating torque bearing having projected portions in a toothed-wheel shape formed on the rotating axle, the operating lever having slots and a bonding hole into which the rotating torque bearing fits, and the rotating axle and the operating lever are bonded together by ultrasonic bonding at the torque bearing.

A width W1 of one of the slots is preferably set to be narrower than a width W2 of another one of the slots, and a width W3 of one of the projected portions of the corresponding rotating torque bearing is preferably set to be narrower than a width W4 of another one of the projected portions. The widths W1, W2, W3 and W4 are preferably set according to the relationship W3≦W1<W4≦W2.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

Figure 1:
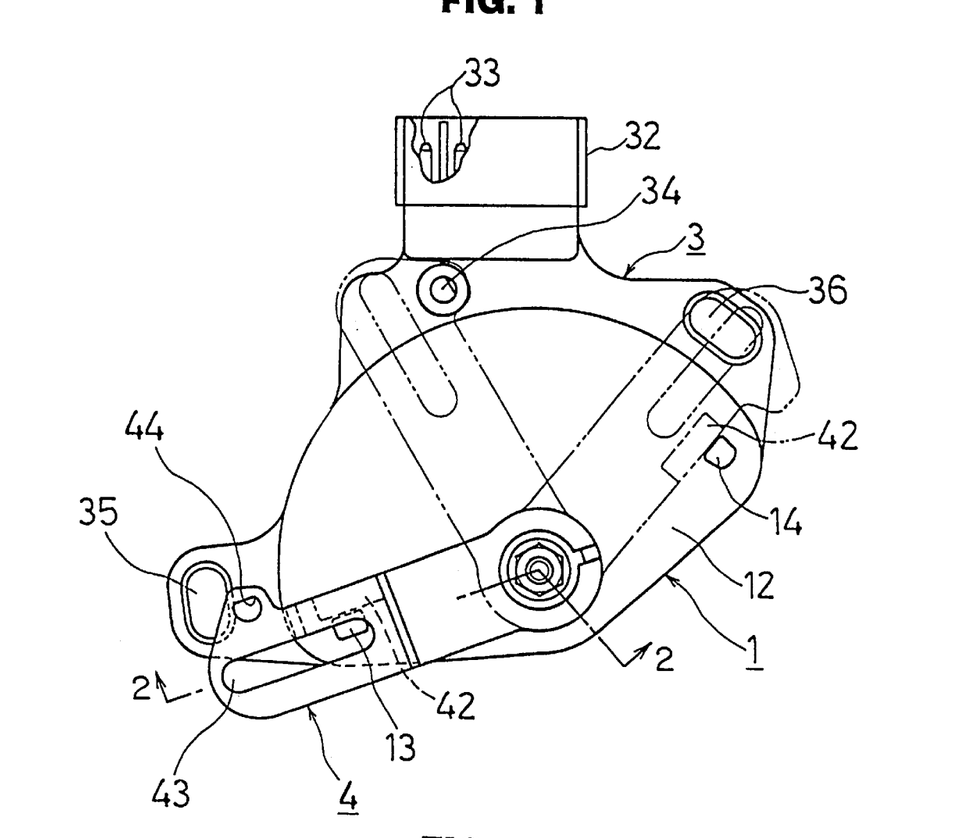
FIG. 1 is a plan view of an inhibitor switch device according to a first embodiment of the present invention.
Figure 2:
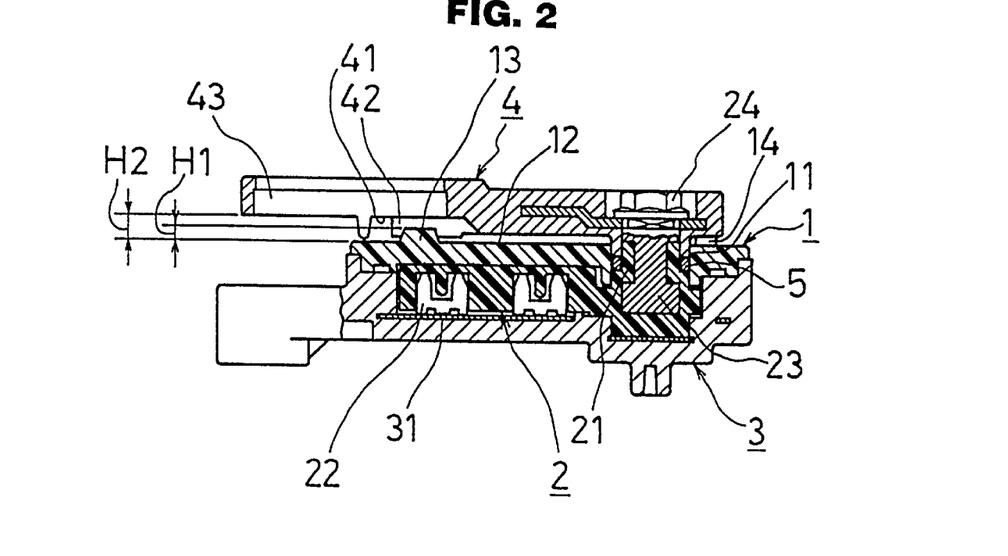
FIG. 2 is a cross-sectional side view of the inhibitor switch device according to the first embodiment of the present invention as viewed along the line 2—2 in FIG. 1.

A first embodiment of an inhibitor switch device according to the present invention will now be described in detail with reference to FIGS. 1 and 2 of the drawings.

A case 1 is made from a synthetic resin and has a bearing hole 11 that fits a rotating axle 21 (described below) so that the rotating axle 21 rotates freely. A movable plate 2 is made out of a synthetic resin, such as, for example, polyphenylene sulfide (PPS). The movable plate 2 is integral with the rotating axle 21 and has a movable contact point 22 on a bottom portion thereof. A metal shaft 23 is formed by insertion molding within the rotating axle 21. An operating lever 4 is fixed to the rotating axle 21 by tightly threading a nut 24 onto the shaft 23, so that the operating lever 4 and the movable plate 2 interlock and move with the rotating axle 21 on an axis. The operating lever 4 can move freely on an external surface 12 of the case 1, and the movable plate 2 can move freely within the case 1.

A platform 3 supports a fixed contact point 31, which corresponds with the movable contact point 22. The fixed contact point 31 is insertion molded into the platform 3 and is electrically connected with a terminal 33. A connector 32 is integrated with the platform for connecting the inhibitor switch device to an external wire harness or the like (not shown). The platform 3 is connected with the case 1 by ultrasonic bonding or the like, which forms a sealed space between the platform 3 and the case 1. The movable plate 2 is housed within the sealed space. A gap between the rotating axle 21 and the bearing hole 11 is sealed with an O-ring 5 that is mounted on the rotating axle 21.

The operating lever 4 has a slit 43, which is connected to a manual valve (not shown) of an automatic gear shifter or shift lever (not shown) by a driver's seat so that the operating lever 4 moves when the shift lever is operated. The operating lever 4 has a projected portion 42 on its bottom side 41. Also, the case 1 has stoppers 13 and 14 on an external wall 12. The projected portion 42 impacts the stoppers 13 and 14. A height H1 of the stoppers 13 and 14 from the external wall 12 is set lower than a height H2, which is the height of the bottom side 41 of the operating lever 4 from the external wall 12. Therefore, only the projected portion 42 of the operating lever 4 impacts with the stoppers 13 and 14 of the case 1.

In addition, the operating lever 4 has a positioning portion 44. The positioning portion 44 is used for mounting the inhibitor switch device onto an automatic gear case (not shown) in an appropriate position. The platform 3 has a positioning hole 34 that corresponds with the positioning portion 44. When the inhibitor switch device is mounted on an automatic gear case, a pin (not shown) is pushed through both the positioning portion 44 of the operating lever 4 and the positioning hole 34 of the platform 3 to determine a proper position of the operating lever 4. Then, bolts (not shown) are put through slots 35 and 36 of the platform 3 and fastened to the automatic gear case.

An operation of the inhibitor switch device according to the first embodiment will now be explained.

First, when the driver in the vehicle operates the shift lever, its operation power is transmitted to the automatic gear shifter via an arm on the lower portion of the shift lever to a control cable, which interconnects with the operating lever 4. The operating lever 4 is thereby driven and moves over the external wall 12 of the case 1. When the operating lever 4 moves, the movable plate 2 moves inside the case 1, and the connecting position of the movable contact point 22 and the fixed contact point 31 is switched. Then, the fixed contact point 31 inputs an on/off signal, which corresponds to the shift position, to a controller (not shown) via the terminal 33. Then, the controller conducts a control according to the input signal.

A second embodiment of an inhibitor switch device according to the present invention will now be described in detail with reference to FIGS. 3 to 9 of the drawings.

Figure 3:
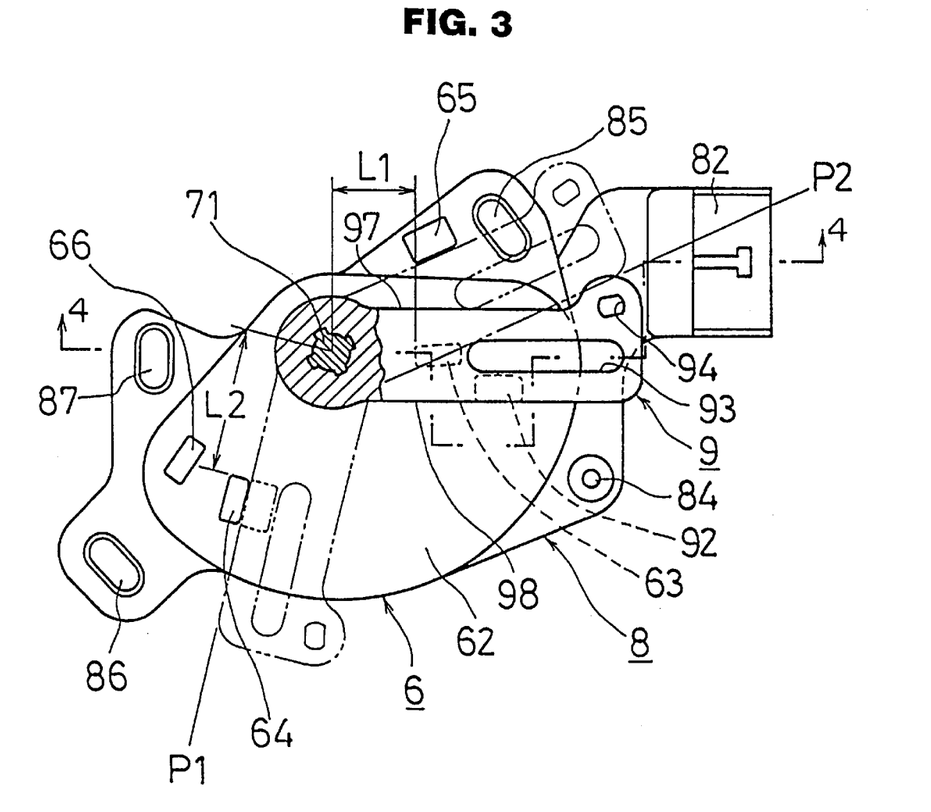
FIG. 3 is a plan view in partial section of an inhibitor switch device according to a second embodiment of the present invention.
Figure 4:
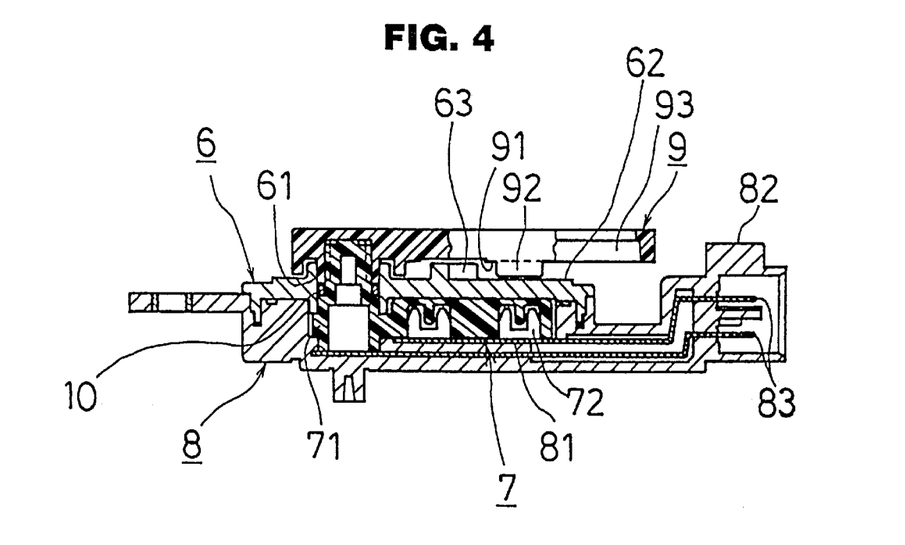
FIG. 4 is a cross-sectional side view of the inhibitor switch device according to the second embodiment of the present invention as viewed along the line 4—4 in FIG. 3.

A case 6 is made from synthetic resin and has a bearing hole 61 that fits a rotating axle 71 (described below) so that the rotating axle 71 rotates freely. A movable plate 7 is made from synthetic resin, such as, for example, PPS resin. The movable plate 7 is integral with the rotating axle 71 and has a movable contact point 72 on a bottom portion thereof. An operating lever 9 is bonded by ultrasonic bonding to the rotating axle 71, so that the operating lever 9 and the movable plate 7 move together with the rotating axle 71 as the axis of rotation. The operating lever 9 moves freely on an external surface 62 of the case 6, and the movable plate 7 is freely movable inside the case 6.

Figure 6:
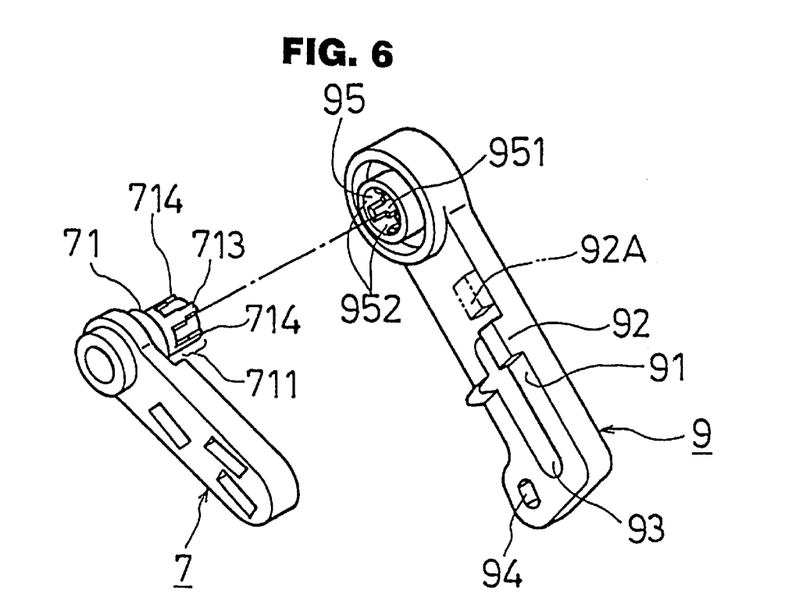
FIG. 6 is a perspective view of the movable plate and operating lever used in the inhibitor switch device shown in FIGS. 3 to 5.
Figure 7:
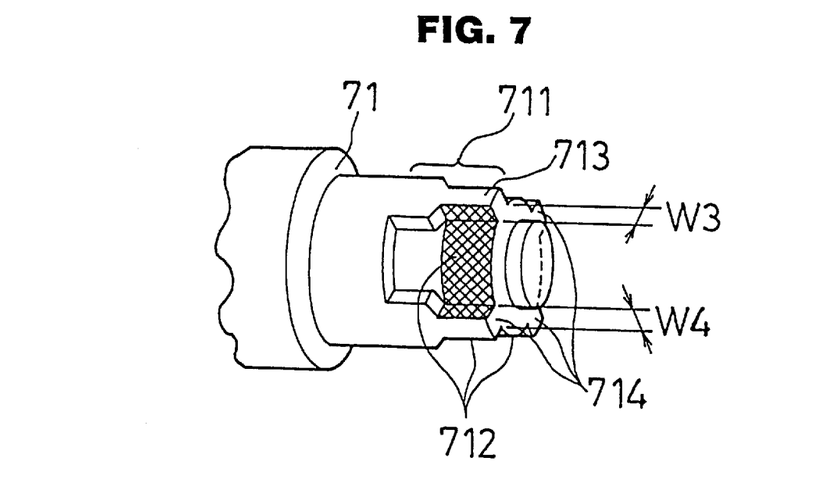
FIG. 7 is an enlarged perspective view of a rotating torque bearing of the movable plate shown in FIG. 6.
Figure 8:
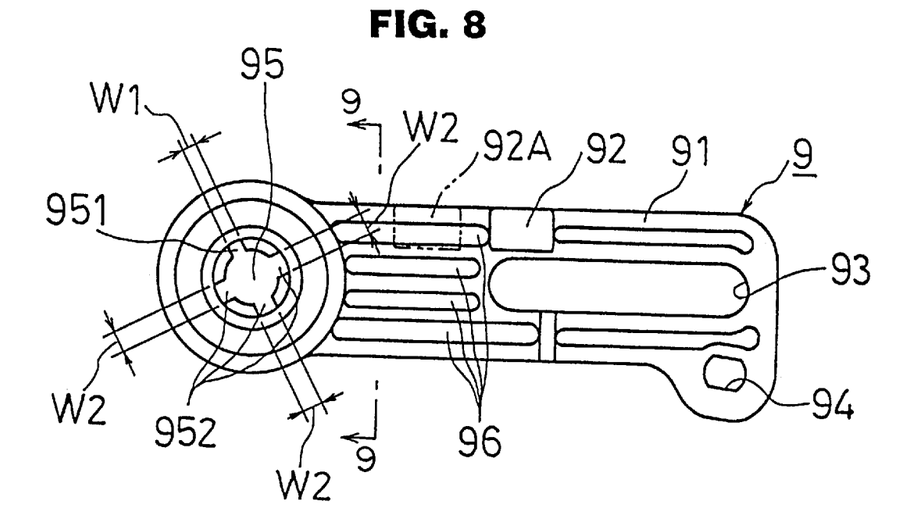
FIG. 8 is an enlarged plan view of the operating lever shown in FIG. 3 as viewed from below.

As shown in FIGS. 6 and 7, the movable plate 7 has a rotating torque bearing 711. The rotating torque bearing 711 has a projecting portion 713 and projecting portions 714, which are organized with interlocking teeth on the rotating axle 71. As shown in FIGS. 6 and 8, the operating lever 9 has gutters 951 and 952 and a bonding hole 95 into which the rotating torque bearing 711 fits. In order to ultrasonically bond the rotating axle 71 and the operating lever 9, the rotating axle 71 is initially inserted into the bearing hole 61 from the inside of the case 6. Then, the gutters 951 and 952 and the bonding hole 95 of the operating lever 9 are fitted over the rotating torque bearing 711, which is projected from the external wall 62 side of the case 6. Then, ultrasonic waves are added from the operating lever 9 side with an ultrasonic bonding head (not shown). Then, a bonding spot 712 of the rotating torque bearing 711 is bonded to the gutters 951 and 951 and the bonding hole 95 of the operating lever 9.

As shown in FIGS. 6 and 7, each of the projected portions 713, 714 comprises a first narrow projected portion and a second wider projected portion, and each of the slots 951, 952 comprises a first narrow slot portion and a second wider slot portion. The narrow projected portions are received in the narrow slot portions when the operating lever 9 is attached to the rotating torque bearing 711, and the wider projected portions are received in the wider slot portions. The bonding spot 712 is located between the narrow projected portions.

As shown in FIG. 8, a width W1 of one of the gutters 951 on the operating lever 9 is set narrower than a width W2 of the other gutters 952 on the operating lever 9. Similarly, on the rotating axle 71, a width W3 of one of the projecting portions 713 of the rotating torque bearing 711 is set narrower than a width W4 of the other projecting portions 714, as shown in FIG. 7. The relationship of the widths W2, W2, W3, and W4 can be expressed as W3≦W1<W4≦W2. By setting the widths in this manner, the relative positioning between the movable plate 7 and the operating lever 9 during assembly can be standardized to prevent improper assembly.

A platform 8 supports a fixed contact point 81, which corresponds with the movable contact point 72. The fixed contact point 81 is insertion molded into the platform 8 and is electrically connected with a terminal 83. A connector 82 is integrated with the platform 8 for connecting the inhibitor switch device to an external wire harness or the like (not shown). The platform 8 is connected with the case 6 by ultrasonic bonding or the like, which forms a sealed space between the platform 8 and the case 6. The movable plate 7 is housed within the sealed space. A gap between the rotating axle 71 and the bearing hole 61 is sealed with an O-ring 10 that is mounted on the rotating axle 71.

The operating lever 9 has a coupling slot 93, which is a slot-shaped hole. The coupling slot 93 is coupled to the manual valve of an automatic gear shifter or the shift lever between the car seats so that the operating lever 9 moves when the shift lever is operated. The operating lever 9 has a projecting portion 92 on a bottom side 91 thereof. The case 6 has stoppers 64 and 65 protruding from an external wall 62 thereof. A height of the stopper 64 from the external wall 62 is set smaller than a height of the bottom side 91 of the operating lever 9 from the external wall 62. In addition, a height of the stopper 65 from the external wall 62 is set larger than a height of the bottom side 91 of the operating lever 9 from the external wall 62. Therefore, the projecting portion 92 impacts the stopper 64 at a moving position P1 shown in FIG. 3. In addition, the side 97 of the operating lever 9 impacts the stopper 65 at a moving position P2.

The case 6 contains stoppers 63 and 66 in addition to the stoppers 64 and 65. The stoppers 63 and 66 function to change the moving position of the operating lever 9 from the moving positions P1 and P2 shown in FIG. 3 to the moving positions P3 and P4 shown in FIG. 5 by changing the location of the projecting portion 92A on the operating lever 9 without changing the case 6.

Figure 5:
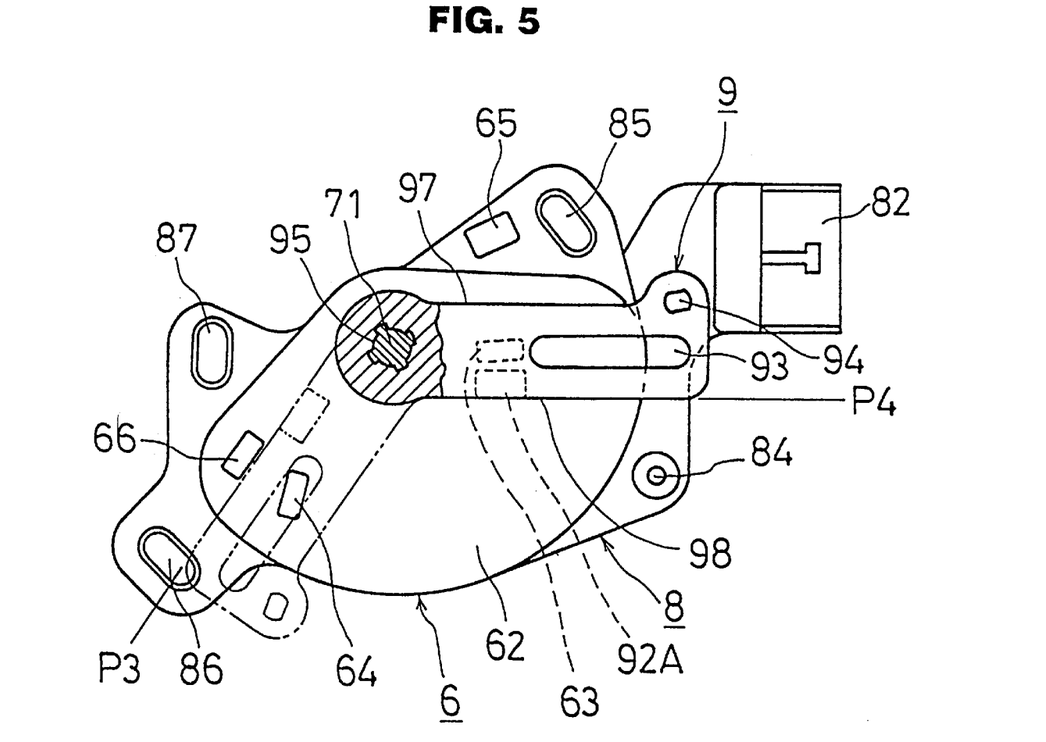
FIG. 5 is a plan view in partial section of the inhibitor switch device shown in FIG. 3 with the location of the operating lever changed.

Specifically, the operating lever 9 can be replaced or altered so that it has a projected portion 92A at the position shown with dotted lines in FIG. 5 and dashed lines in FIGS. 6 and 8, instead of a projected portion 92 at the position shown in FIG. 3. The height of the stopper 63 from the external wall 62 is set lower than the height from the external wall 62 to the bottom side 91 of the operating lever 9. The height of the stopper 66 from the external wall 62 is set higher than the height from the external wall 62 to bottom side 91 of the operating lever 9. In addition, the distance L1 from the center of the rotating axle 71 to the stopper 63 is set shorter than the distance L2 from the center of the rotating axle 71 to the stopper 64. The stopper 63 is positioned in alignment with the path of movement of the projecting portion 92A on the operating lever 9A. Therefore, the projecting portion 92A impacts the stopper 63 at the moving position P4, as shown in solid lines in FIG. 5, and the other side 98 of the operating lever 9 impacts the stopper 66 at the moving position P3, as shown in dashed lines in FIG. 5.

Figure 9:
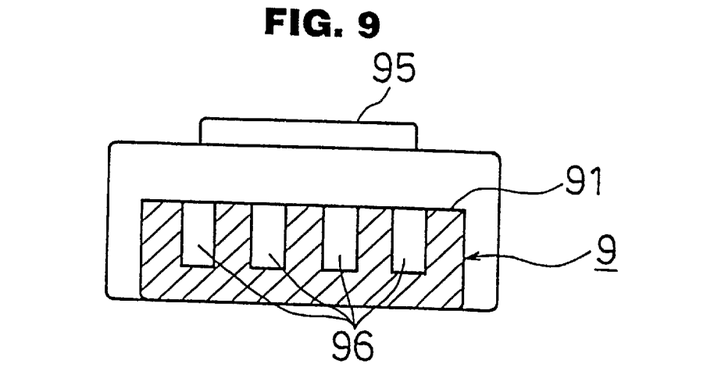
FIG. 9 is a cross-sectional view of the operating lever as viewed along the line 9—9 in FIG. 8.

The operating lever 9 has a strength adjusting portion 96, as shown in FIGS. 8 and 9. The strength adjusting portion 96 is a portion to adjust the strength of the operating lever 9 so as to control the location of any breakage that might occur in the operating lever 9. The strength adjusting portion 96 is set at an appropriate strength so that the operating lever 9 will not be broken by a regular external force during normal operation of the operating lever 9. However, when an unexpected external force is applied, the operating lever 9 is designed to break at the strength adjusting portion 96, instead of at the rotating axle 71. For example, if the operating lever 9 accepts an external force in an up and down direction while driving the vehicle in addition to the normal rotating force, or if the operating lever 9 is stressed while installing the inhibitor switch device, the strength adjusting portion 96 will break without causing damage to the rotating axle 71.

The strength adjusting portion 96 comprises a plurality of grooves extending in a longitudinal direction on a lower side of the operating lever 9. The grooves extend from an end point of the operating lever 9 adjacent the rotating axle 71 to an intermediate point of the operating lever 9 spaced from the rotating axle 71. The strength of the strength adjusting portion 96 can be adjusted by changing the size of the width of the grooves during the process of molding the operating lever 9 in a metal mold. Moreover, a plurality of metal molds having different groove widths can be used to provide operating levers 9 having different strengths. The operating levers 9 having different strengths based on the groove width of the strength adjusting portion 96 can be used to provide an operating lever 9 having the precise strength necessary and suitable for each switch application.

In addition, the operating lever 9 has a positioning portion 94. The positioning portion 94 is for mounting the inhibitor switch device onto an automatic gear case (not shown) in the appropriate position. The platform 8 has a positioning hole 84 that matches with the positioning portion 94. When the inhibitor switch device is mounted on an automatic gear case, a pin (not shown) is pushed through both the positioning portion 94 of the operating lever 9 and the positioning hole 84 of the platform 8. Then, bolts (not shown) are inserted into the slots 85 and 86 of the platform 8 to fasten the platform 8 onto the automatic gear case. The operation of the second embodiment is generally the same as the first embodiment described above and, therefore, a further explanation will be omitted.

As described above, the present invention provides an inhibitor switch device that has projected portions on the bottom side of the operating lever and stoppers where the projected portions impact the external wall of the case. With this arrangement, even in the event that the movement range of the operating lever goes outside of the case, it is not necessary to have the stoppers on a portion in addition to the external wall of the case. In addition, the height of the stoppers are set lower than the height of the bottom side of the operating lever so that only the projected portion on the operating lever can impact the stoppers. Also, each stopper is mounted at respective locations that are different distances from the center of the rotating axle, so that by just changing the position of the projected portions on the operating lever, the range of movement of the operating lever can be changed. In other words, the range of movement of the operating lever can be changed without changing the case so that the case can be used in either situation.

Also, as described above, the present invention has a rotating torque bearing that makes up one side of the rotating axle with projecting portions shaped in a toothed-wheel form, and an operating lever having gutters and a bonding hole into which the rotating torque bearing fits. The rotating axle and operating lever are ultrasonically bonded together at the rotating torque bearing so that, when the material of the rotating axle is changed from metal to a resin material, the rotating torque bearing can increase the strength of the ultrasonically bonded portion and prevent the bonded portion from being broken by the rotating torque that the operating lever receives. In addition, the width W1 of one of the gutters is set narrower than the width W2 of the other gutters, and a width W3 of one of the projected portions of the rotating torque bearing is set narrower than the width W4 of the corresponding other projected portions. Therefore, the relative position of the movable plate and the operating lever during assembly is standardized to prevent incorrect assembly.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An inhibitor switch device comprising:

a case (1, 6) with a bearing hole (11, 61);

a rotating axle (21, 71) that fits into said bearing hole (11, 61) so that said rotating axle rotates freely;

a movable plate (2, 7) that moves freely in said case (1, 6), said movable plate being integrated with said rotating axle (21, 71);

a movable contact point (22, 72) supported on said movable plate (2, 7);

a fixed contact point (31, 81) that corresponds with said movable contact point (22, 72);

a platform (3, 8) that supports said fixed contact point (31, 81) and houses said movable plate (2, 7) in conjunction with said case (1, 6); and an operating lever (4, 9) that is fixed to said rotating axle (21, 71) and moves on an external surface (12, 62) of said case (1, 6);

wherein a projected portion (42, 92, 92A) is formed on the bottom side (41, 91) of said operating lever (4, 9), and stoppers (13, 14, 63, 64) which impact with said projected portion (42, 92, 92A) are formed on an external wall (12, 62) of said case (1, 6).

2. The inhibitor switch device according to claim 1, wherein a height (H1) of said stoppers (13, 14, 63, 64) from said external wall (12, 62) is set lower than a height (H2) of a bottom side (41, 91) of said operating lever (4, 9) from said external wall (12, 62).

3. The inhibitor switch device according to claim 2, wherein each stopper (63, 64) is located at a different distance (L1, L2) from a center of rotation of said rotating axle (71).

4. The inhibitor switch device according to claim 1, wherein each stopper (63, 64) is located at a different distance (L1, L2) from a center of rotation of said rotating axle (71).

5. The inhibitor switch device according to claim 1, wherein a first one of said stoppers (13) extends from said external wall adjacent a first edge of said case (1), a second one of said stoppers (14) extends from said external wall adjacent a second edge of said case (1), and said projected portion (42) engages said first stopper (13) at a position in which at least a portion of said operating lever (4) has moved past said first stopper (13) and said first edge of said case (1).

6. The inhibitor switch device according to claim 1, wherein said stoppers comprise a first set of stoppers (63, 66) and a second set of stoppers (64, 65), said first set of stoppers permitting a range of movement of said operating lever (9) which is different than a range of movement permitted by said second set of stoppers.

7. The inhibitor switch device according to claim 6, wherein:

said first set of stoppers comprises a first stopper (63) and a second stopper (66), said first stopper (63) having a height that permits said operating lever (9) to pass over said first stopper (63), said second stopper (66) having a height sufficient to prevent said operating lever (9) from passing over said second stopper (66);

said second set of stoppers comprises a third stopper (64) and a fourth stopper (65), said third stopper (64) having a height that permits said operating lever (9) to pass over said third stopper (64), said fourth stopper (65) having a height sufficient to prevent said operating lever (9) from passing over said fourth stopper (65); and said first stopper (63) is located at a first distance (L1) from a center of rotation of said rotating axle (71) and said third stopper (64) is located at a second distance (L2) from said center of rotation of said rotating axle (71), said first distance (L1) being less than said second distance (L2).

8. An inhibitor switch device comprising:

a case (6) with a bearing hole (61);

a rotating axle (71) that fits into said bearing hole (61) so that said rotating axle rotates freely;

a movable plate (7) that moves freely in said case (6), said movable plate being integrated with said rotating axle (71);

a movable contact point (72) supported on said movable plate (7);

a fixed contact point (81) that corresponds with said movable contact point (72);

a platform (8) that supports said fixed contact point (81) and houses said movable plate (7) in conjunction with said case (6);

an operating lever (9) that is fixed to said rotating axle (71) and moves on an external surface (62) of said case (6); and a rotating torque bearing (711) having projected portions (713, 714) in a toothed-wheel shape formed on said rotating axle (71), said operating lever (9) having slots (951, 952) and a bonding hole (95) into which said rotating torque bearing (711) fits, and said rotating axle (71) and said operating lever (9) are bonded together by ultrasonic bonding at said torque bearing (711).

9. The inhibitor switch device according to claim 8, wherein a width W1 of one of said slots (951) is set to be narrower than a width W2 of another one of said slots (952), and a width W3 of one of said projected portions (713) of the corresponding rotating torque bearing is set to be narrower than a width W4 of another one of said projected portions (714).

10. The inhibitor switch device according to claim 9, wherein said widths W1, W2, W3 and W4 are set according to the relationship $W3 \leq W1 < W4 \leq W2$.

11. The inhibitor switch device according to claim 8, wherein each of said projected portions (713, 714) comprises a first narrow projected portion and a second wider projected portion, each of said slots (951, 952) comprises a first narrow slot portion and a second wider slot portion, said narrow projected portions being received in said narrow slot portions, and said wider projected portions being received in said wider slot portions, said widths (W1, W2, W3, W4) being measured at said narrow projected portions and said narrow slot portions, respectively.

12. The inhibitor switch device according to claim 11, wherein an ultrasonic bond is formed between said rotating axle (71) and said operating lever (9) at a bonding spot (712) located between said narrow projected portions.

* * * * *